United States Patent [19]

Fujita et al.

[11] 4,256,678
[45] Mar. 17, 1981

[54] METHOD OF AND APPARATUS FOR CONTROLLING RESIN PLASTICIZING PROCESS OF IN-LINE SCREW-TYPE INJECTION MOLDING MACHINES

[75] Inventors: Shigeru Fujita, Numazu; Hideo Banzai, Mishima; Takashi Goto, Numazu, all of Japan

[73] Assignee: Toshiba Kikai Kabushiki Kaisha, Tokyo, Japan

[21] Appl. No.: 81,203

[22] Filed: Oct. 2, 1979

[30] Foreign Application Priority Data

Oct. 5, 1978 [JP] Japan ............................ 53-122832

[51] Int. Cl.³ .................................. B29F 1/06
[52] U.S. Cl. ............................. 264/40.1; 366/78; 425/145
[58] Field of Search ................. 366/78, 289; 425/145, 425/150; 264/40.1, 40.5, 349

[56] References Cited

U.S. PATENT DOCUMENTS

| | | | |
|---|---|---|---|
| 3,797,808 | 3/1974 | Ma et al. | 366/78 |
| 3,921,963 | 11/1975 | Neff et al. | 366/78 |
| 4,146,601 | 3/1979 | Bishop | 264/40.1 |

FOREIGN PATENT DOCUMENTS

| | | | |
|---|---|---|---|
| 52-37494 | 9/1977 | Japan | 264/40.1 |
| 1360576 | 7/1974 | United Kingdom | 264/40.1 |

*Primary Examiner*—Philip R. Coe
*Attorney, Agent, or Firm*—Koda and Androlia

[57] ABSTRACT

In a method of and apparatus for controlling a plasticizing process of a resin of an in-line screw-type injection molding machine, a position of the screw is continuously detected in accordance with the movement thereof and a control function is determined by a back pressure of the screw which is compensated for by taking into consideration such as resin heating energy and shearing energy, which determine a temperature distribution of a resin to be injected. The operating condition, particularly the number of revolutions and the back pressure of the screw, is controlled on the basis of the screw position so as to make uniform the temperature distribution of the resin.

5 Claims, 4 Drawing Figures

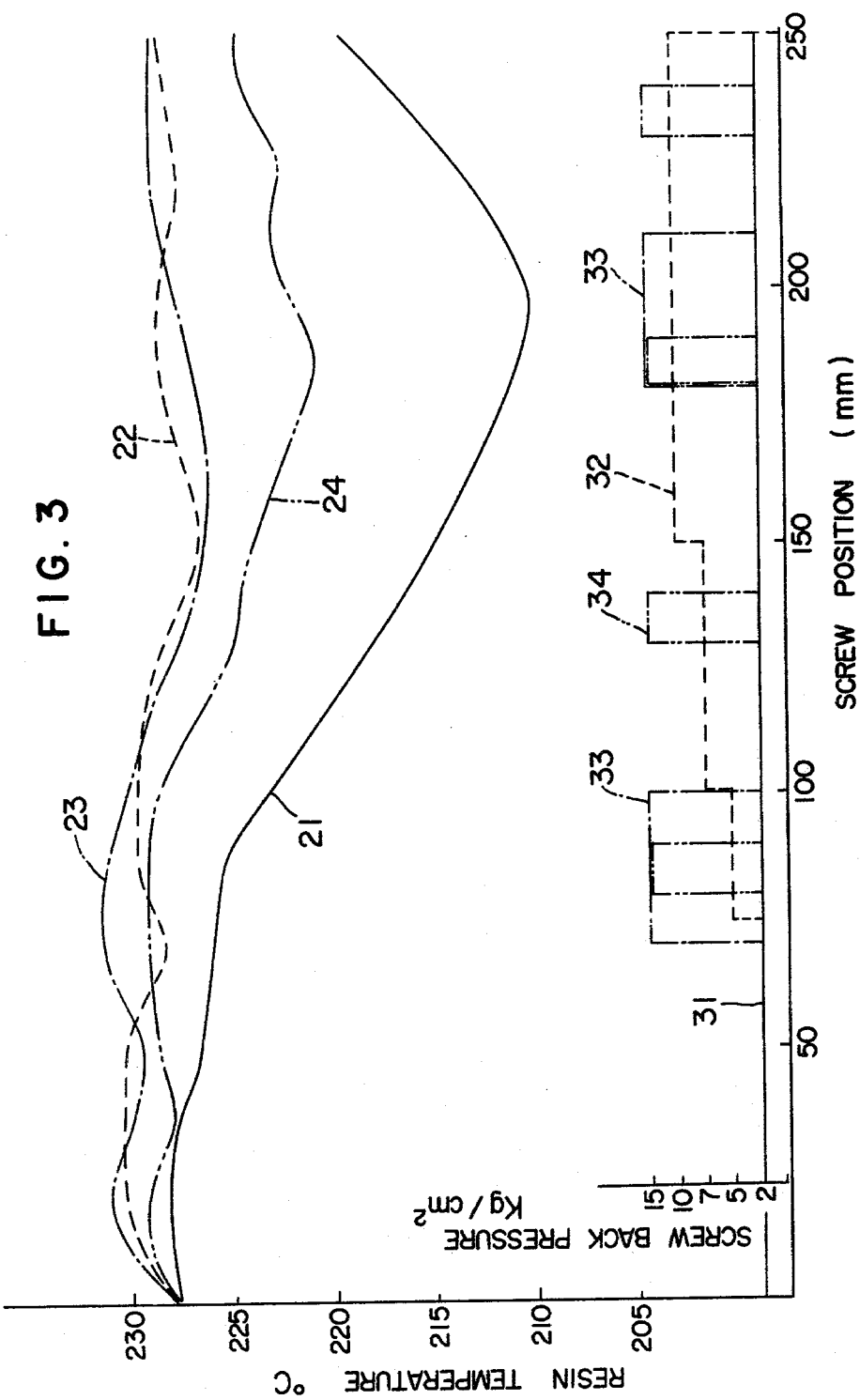

METHOD OF AND APPARATUS FOR CONTROLLING RESIN PLASTICIZING PROCESS OF IN-LINE SCREW-TYPE INJECTION MOLDING MACHINES

BACKGROUND OF THE INVENTION

This invention relates to a method of and apparatus for controlling a plasticizing process of a resin in an in-line screw-type injection molding machine for the purpose of obtaining a resin having entirely uniform temperature distribution after the resin has been plasticized by controlling back pressure of a screw.

Generally, in an injection molding machine having an in-line screw-type plasticizing mechanism, a resin fed into a heating cylinder of the mechanism is melted and plasticized therein by heating energy applied by a heater and shearing energy caused by the rotation of the screw. The heating energy is applied to the resin in proportion to the time during which the resin stays in the heating cylinder. However, it is rather rare that the entire resin measured and fed into the heating cylinder by one resin measuring step is used for one injection molding shot, and usually the mixture of the resin measured and fed by two or more measuring steps is injected by two or more molding shots, so that the temperature distribution of the resin to be injected by one molding shot is not uniform. In addition, since the depths between the respective screw threads are not equal throughout the entire length of the screw, heat transfer rate varies at respective positions of the screw and therefore, the temperature distribution of the resin becomes non-uniform. Moreover, the shearing energy also varies and is not constant for the reason that the effective length of the screw (i.e. the length from a hopper for supplying a resin to the front end of the screw) decreases as the screw is moved backwardly after the completion of the plasticizing process.

In order to make uniform the temperature distribution of the resin after the resin plasticization step, it is necessary to compensate for the variations in the heating energy and the shearing energy, for example, by controlling the number of revolutions and/or the back pressure of the screw. The control of the number of revolutions of the screw changes the shear rate (i.e. shearing energy) of the screw and this control affects the entire resin in molten state existing in the spaces between the threads of the screw. The control of the back pressure increases a pressure to be applied to the threads of the front end of the screw thereby increasing the mixing effect of the resin existing in the spaces between the threads of the screw along a limited length of the screw which is subjected to the effect of the back pressure.

According to a prior art method of controlling temperature distribution of a resin after the plasticization step, it is necessary to gradually or stepwisely increase or decrease the number of revolutions and the back pressure of the screw. However, according to this method, it takes much time to increase the back pressure of the screw, and moreover, it is obliged to decrease the speed of the backward movement of the screw during the increasing of the back pressure. Thus, the resin plasticizing process in the prior art takes much time for one injection molding cycle and the production efficiency of molded products is lowered.

SUMMARY OF THE INVENTION

Accordingly, it is an object of this invention to provide an improved method of and apparatus for controlling a plasticizing process of a resin of an in-line screw-type injection molding machine capable of making uniform the temperature distribution of the resin after the resin plasticization step by an operation wherein a device which sets a normal back pressure of the screw is switched with a predetermined timing to a device which sets a back pressure for compensating for the normal back pressure.

According to this invention, in one aspect, there is provided a method of controlling a plasticizing process of a resin of an in-line screw-type injection molding machine of the type comprising a heating cylinder, a hopper for supplying the resin into the heating cylinder at one end thereof, a screw provided in the heating cylinder, and a hydraulic assembly for reciprocating and rotating the screw in the heating cylinder, in which back pressure of the screw is controlled during the resin plasticizing process, wherein the method comprises the steps of detecting a process variable regarding a position of the screw, presetting a position of the screw at which a first back pressure of the screw and a second back pressure for compensating for the first back pressure are to be alternately switched, comparing a signal regarding the back pressure switching position, and switching the first and second back pressures alternately in accordance with a predetermined sequence, thereby making uniform temperature distribution of the resin for one injection molding shot existing in a space between threads of the screw after the completion of the resin plasticizing process.

In another aspect of this invention, there is provided apparatus for carrying out the method described above which comprises a detector for detecting a process variable regarding a position of the screw, a device for presetting a position of the screw at which the first and second back pressures are to be alternately switched, a comparator for comparing a signal from the detecting device with a signal from the switching position presetting device, and back pressure switching means for alternately switching the first and second back pressures.

BRIEF DESCRIPTION OF THE DRAWINGS

In the accompanying drawings:

FIG. 3 is a graph showing result of tests carried out in accordance with the methods of this invention and the prior art.

DESCRIPTION OF THE PREFERRED EMBODIMENTS

Figure 1:
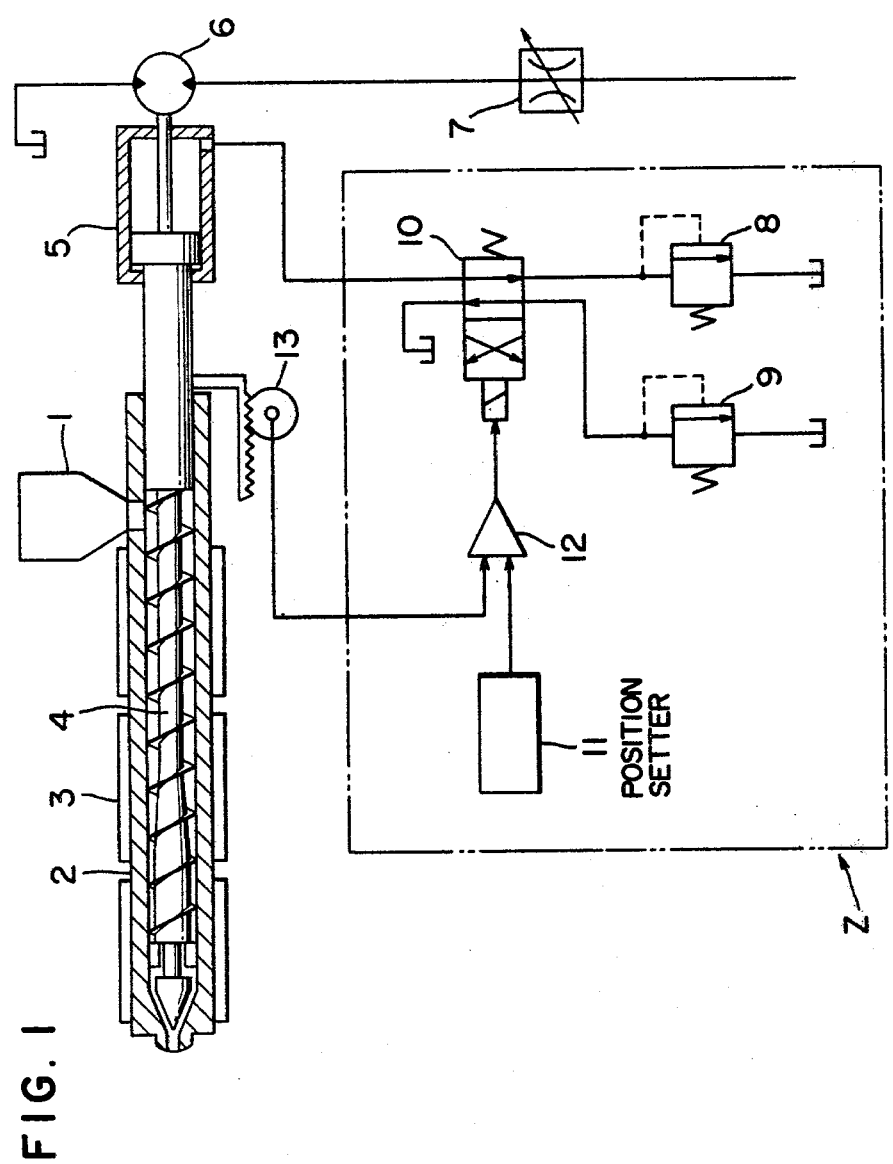
FIG. 1 is a diagrammatical view showing one embodiment according to this invention.

Referring to FIG. 1, a raw material such as a thermoplastic resin is fed into a heating cylinder 2 from a hopper 1 attached to the heating cylinder 2 of an in-line screw-type injection molding machine.

The heating cylinder 2 is heated by an electric heater 3 which is mounted on the outer surface of the cylinder 2 and the heating temperature is controlled by adjusting means, not shown. Within the heating cylinder 2 is provided a screw 4 which is reciprocated by hydraulic cylinder means 5 and rotated by a hydraulic motor 6. An electromagnetic flow control valve 7 is connected in series with the hydraulic motor 6 so as to control flow amount of pressurized oil which operates the hydraulic motor 6 thereby controlling the rotating speed of the screw 4.

Electromagnetic pressure control valves 8 and 9 are connected to the hydraulic cylinder means 5 for respectively setting a back pressure during the normal operation and a back pressure for compensating for the normal back pressure to obtain a uniform temperature distribution of the resin after the resin plasticization process. A change-over valve 10 connected between the control valves 8, 9 and the hydraulic cylinder means 5 operates to switch the circuit of the pressure control valves 8 and 9.

A device 11 serves to set positions at which the back pressure of the screw is to be changed, and two or more positions can be set in this position setting device 11 as occasion demands. The position of the screw 4 during its movement is continuously detected by a device 13 for detecting a screw position. The device 13 is driven by the screw and includes a potentiometer, not shown, which generates a signal regarding the screw position. This signal is sent to a comparator 12 which compares the signal from the potentiometer 13 with a signal from the switching position setting device 11 and generates a signal at a time when both signals coincide with each other, thereby switching the change-over valve 10 to control the back pressure of the screw 4.

The operation of the apparatus shown in FIG. 1 will be described hereunder in conjunction with FIG. 2.

When the plasticizing process of the resin starts, the back pressure of the screw 4 is adjusted to a pressure $P_1$ (FIG. 2) to be applied to the resin in a normal plasticizing process and the screw is rotated and moved. When the screw 4 reaches a position $x_1$ preset by the position setting device 11, a signal from the comparator 12 is sent to the change-over valve 10 to switch the pressure control valve 8 to the other pressure control valve 9, thus changing the back pressure $P_1$ of the screw to a back pressure $P_2$ for compensating for the normal back pressure. Then, the resin plasticizing process continues until the screw reaches a position $x_2$ which is preset by the position setting device 11 under the back pressure $P_2$. Upon reaching the position $x_2$, a signal from the comparator 12 is generated to again switch the change-over valve 10 so as to change the back pressure from $P_2$ to $P_1$. When the screw reaches a position $x_3$ and a signal from the potentiometer 13 coincides with that from the position setting device 11, a signal is generated from the comparator 12 to switch the change-over valve 10 thereby changing the back pressure of the screw from $P_1$ to $P_2$. The resin plasticizing process still proceeds under the pressure $P_2$ until the screw reaches the position $x_4$. Upon reaching the position $x_4$, the pressure $P_2$ is again changed to $P_1$, and when the screw reaches the final position $x_5$, the resin plasticizing process completes.

Figure 2:
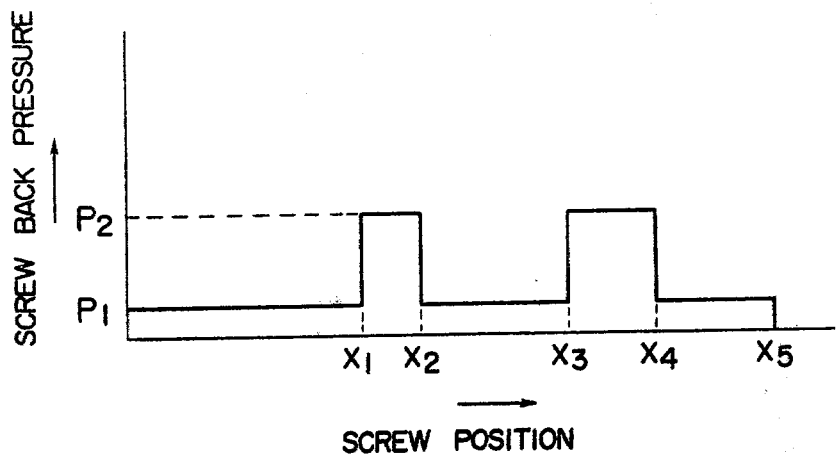
FIG. 2 is a graph showing the relationship between the back pressure and the position of the screw of the apparatus shown in FIG. 1.

As clearly shown in FIG. 2, the pressure $P_2$ higher than the pressure $P_1$ is applied to the resin for a time considerably shorter than that when the pressure $P_1$ is applied. Therefore, defects, as described hereinbefore, caused by increasing the back pressure in a prior art apparatus can be eliminated.

FIG. 3 shows the result of tests in which four types of back pressures are applied to compensate for the normal back pressure of the screw. These tests were carried out by plasticizing polypropylene by using a screw having a diameter of 50 mm and a metering stroke 250 mm and the screw was rotated at 150 r.p.m. under the heating temperature of 220° C. The temperature distributions of the polypropylene in these tests were obtained by measuring the temperature of the resin which is purged from a nozzle portion at the front end of the heating cylinder by rotating the screw at an extremely low speed after completion of the resin plasticizing process.

The measured temperature distributions are shown in FIG. 3, wherein:

(1) A curve 21 shows a temperature distribution of the resin when the back pressure of the screw is maintained for 23 seconds at 2 kg/cm² during the entire resin plasticizing process as shown by a line 31. The curve 21 shows that the temperature distribution has temperature difference of 18° C., which is too large to carry out the injection molding.

(2) A curve 22 shows a temperature distribution of the resin in a case where the back pressure of the screw was controlled as shown by a stepwisely increasing line 32. Although in this case the temperature difference was controlled to be about 4° C., a considerably long time was required for increasing the back pressure, and it took 41 seconds for the resin plasticization which is too long to plasticize the resin. The curve 22 is a typical one example showing a defect of the conventional method.

(3) Curves 23 and 24 show temperature distribution of the resin in cases where the back pressures of the screw were controlled by the method according to this invention as shown by graphs 33 and 34, respectively. The graph 33 shows that the back pressure of the screw was raised twice from 2 kg/cm² to 15 kg/cm² for a time when screw is moved by 30 mm. In this case, the temperature difference of 6° C. was measured and it took 33 seconds for the resin plasticization. The graph 34 shows that the back pressure was raised four times from 2 kg/cm² to 15 kg/cm² for a time when the screw is moved by 10 mm. In this case, the temperature difference of 8° C. was measured and it took 28 seconds for the resin plasticization.

These plasticizing times of 33 and 28 seconds in both cases are much shorter than that, i.e. 41 seconds, in the case (2). The temperature distribution curve 23 is substantially identical to the curve 22 which has small temperature difference, and the back pressure of the screw will be controlled as shown by the graph 34 if it is required to plasticize the resin in a short time, and in such a case the temperature difference is 8° C.

Figure 4:
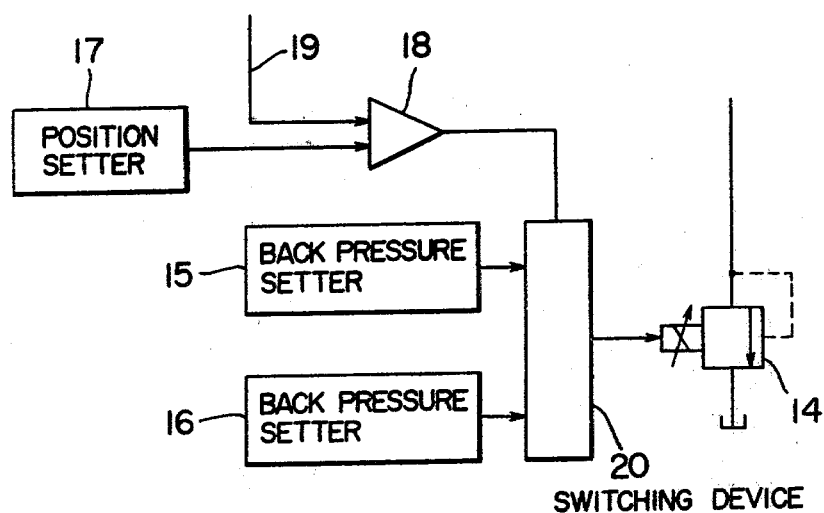
FIG. 4 is a block diagram showing another embodiment according to this invention.

FIG. 4 shows a modification of the back pressure controlling unit, represented by a block Z in FIG. 1, of an in-line screw-type injection molding machine, in which an electromagnetic proportional pressure control valve 14 is controlled by a device 15 for setting the valve of the normal back pressure of the screw and a device 16 for compensating for the normal back pressure. There is provided a device 17 for setting a position which switches the back pressure of the screw so as to set two or more positions to be switched as occasion demands. A comparator 18 serves to compare a positional signal generated from the potentiometer 13 with a signal from the switching position setting device 17 and when these signals coincide with each other, a signal is applied from the comparator 18 to a signal switching device 20. Then, the signal switching device 20 switches the position setting device 15 or 16 or vice versa and generates a signal to control the electromagnetic valve 14, thereby controlling the back pressure of the screw.

Thus, according to this invention, it becomes possible to make substantially uniform the temperature distribution of the resin after the resin plasticizing process by controlling the back pressure of the screw.

We claim:

1. In a method of controlling a plasticizing process of a resin of an in-line screw-type injection molding machine of the type comprising a heating cylinder, means for supplying the resin into said heating cylinder at one end thereof, a screw provided in said heating cylinder, and hydraulic means for reciprocating and rotating said screw in said heating cylinder, in which back pressure of said screw is controlled during the resin plasticizing process, the improvement which comprises the steps of detecting a process variable regarding a position of the screw, presetting a position of said screw at which a first back pressure of the screw and a second back pressure for compensating for said first back pressure are to be alternately switched, comparing a signal regarding the screw position with a signal regarding the back pressure switching position, and switching said first and second back pressures alternately in accordance with a predetermined sequence, thereby making uniform temperature distribution of the resin for one injection molding shot existing in a space between threads of said screw after the completion of the resin plasticizing process.

2. The method according to claim 1 wherein a time for applying said second back pressure is predetermined to be shorter than that for applying said first back pressure.

3. In apparatus for controlling a plasticizing process of a resin of an in-line screw-type injection molding machine of the type comprising a heating cylinder, means for supplying the resin into said heating cylinder at one end thereof, a screw provided in said heating cylinder, and hydraulic means for reciprocating and rotating said screw, said hydraulic means being controlled during the resin plasticizing process, the improvement which comprises means for detecting a process variable regarding a position of said screw, means for presetting a position of said screw at which a first back pressure of the screw and a second back pressure for compensating for said first back pressure are to be alternately switched, a comparator for comparing a signal from said detecting means with a signal from said switching position presetting means, and means for alternately switching said first and second back pressures.

4. The apparatus according to claim 3 wherein said back pressure switching means comprises first and second valves for respectively controlling said first and second back pressures, and a change-over valve for switching said first and second valves in accordance with a signal from said comparator.

5. The apparatus according to claim 3 wherein said back pressure switching means comprise a device for setting said first back pressure, a device for setting said second back pressure, a device for switching said back pressure setting devices in accordance with a signal from said comparator, and a valve for controlling the back pressure of said screw in accordance with a signal from said switching device.

* * * * *